(12) United States Patent
Bhardwaj et al.

(10) Patent No.: US 9,140,802 B2
(45) Date of Patent: Sep. 22, 2015

(54) AUXILIARY AS VEHICLE SPEED WHEN DIFFERENCE BETWEEN AUXILIARY AND PROPAGATION ABOVE THRESHOLD

(71) Applicant: TEXAS INSTRUMENTS INCORPORATED, Dallas, TX (US)

(72) Inventors: Sachin Bhardwaj, Bangalore (IN); Jaiganesh Balakrishnan, Bangalore (IN); Sriram Murali, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 48 days.

(21) Appl. No.: 13/958,765

(22) Filed: Aug. 5, 2013

(65) Prior Publication Data
US 2015/0039154 A1    Feb. 5, 2015

(51) Int. Cl.
*G01S 19/49*    (2010.01)
*G01C 21/16*    (2006.01)

(52) U.S. Cl.
CPC .................. *G01S 19/49* (2013.01); *G01C 21/16* (2013.01)

(58) Field of Classification Search
CPC ......... G01S 19/47; G01S 19/49; G01S 19/41; G01C 21/16; G01C 25/005
See application file for complete search history.

(56) References Cited

U.S. PATENT DOCUMENTS

| | | | |
|---|---|---|---|
| 5,787,384 A * | 7/1998 | Johnson ........................ | 701/472 |
| 2004/0150557 A1 * | 8/2004 | Ford et al. ................ | 342/357.14 |
| 2008/0319606 A1 * | 12/2008 | Fortson et al. ................... | 701/35 |
| 2010/0076681 A1 * | 3/2010 | Colley ........................... | 701/213 |
| 2010/0256939 A1 * | 10/2010 | Borenstein ...................... | 702/96 |
| 2011/0098882 A1 * | 4/2011 | Sugisawa et al. ............... | 701/35 |
| 2011/0105957 A1 * | 5/2011 | Kourogi et al. ............... | 600/595 |
| 2014/0088800 A1 * | 3/2014 | Mercer ........................... | 701/14 |

OTHER PUBLICATIONS

Woodman, Oliver J., An Introduction to Inertial Navigation, Aug. 2007, University of Cambridge.*

* cited by examiner

*Primary Examiner* — Khoi Tran
*Assistant Examiner* — Ryan Rink
(74) *Attorney, Agent, or Firm* — Lawrence J. Bassuk; Charles A. Brill; Frank D. Cimino

(57) ABSTRACT

In the present disclosure, an error in the velocity and position computed from a three dimensional IMU measurement is reduced confined by computing an auxiliary speed in a drive direction of a vehicle from an angular velocity measurement and a lateral acceleration measurement. The auxiliary speed is then compared with the speed computed from the acceleration measurement. The auxiliary speed is provided as the speed of the vehicle mounted with the IMU when the absolute difference between the auxiliary speed and the speed computed from the acceleration measurement in the drive direction is above a threshold. The auxiliary speed is computed when the vehicle is detected to be in a curved motion. According to another aspect of the present disclosure, the bias errors are determined when the vehicle is in a steady state, at rest or in a straight line motion. The bias errors are used to obtain the accurate auxiliary measurement.

20 Claims, 6 Drawing Sheets

AUXILIARY AS VEHICLE SPEED WHEN DIFFERENCE BETWEEN AUXILIARY AND PROPAGATION ABOVE THRESHOLD

TECHNICAL FIELD

The present disclosure relates generally to a navigation system and more specifically to a method, system and apparatus for reducing the effect of inertial sensor's error in a vehicular navigation.

RELATED ART

In a vehicular navigation system, position and velocity information is often derived from a global navigation satellite system (GNSS) and/or from the inertial navigation system (INS). The INS is generally integrated with GNSS system to navigate the vehicle using the output of both systems. For example, when the GNSS satellites are not visible (generally, the condition is referred to as dead reckoning) the position and velocity information may be derived from the INS. Further, when the INS computed position and velocity (INS solution) diverge from real/actual value, the INS reference position and velocity may be corrected using the GNSS position and velocity (GNSS solution) as is well known in the art.

Often, errors in velocity and position information derived from the INS measurement increase with respect to time due to inherent bias offset, bias drifts, noise and other errors in the INS sensors. The GNSS position and velocity information is used to reset the INS reference to keep the error within a desirable limit. In various scenarios, the vehicle navigation system may be operated in the dead reckoning mode for longer time or in the absence of GNSS service. Thus, the errors in position and velocity computed from the INS measurement may increase from actual value beyond a permissible limit in the absence GNSS service.

SUMMARY

According to an aspect of the present disclosure, the error in the velocity and position computed from a three dimensional Inertial Measurement Unit (IMU) measurement is confined by computing an auxiliary speed in a drive direction of a vehicle from an angular velocity measurement and a lateral acceleration measurement. The auxiliary speed is then compared with the speed computed from the acceleration measurement in the drive direction. The auxiliary speed is provided as the speed of the vehicle mounted with the IMU when a difference between the auxiliary speed and the speed computed from the acceleration measurement in the drive direction is above a threshold. According to another aspect of the present disclosure, the auxiliary speed is computed when the vehicle is detected to be in a curved motion.

According to another aspect of the present disclosure, the bias errors are determined when the vehicle is in a steady state, at rest or in a straight line motion. The bias error is used to obtain an accurate auxiliary measurement.

Several aspects are described below, with reference to diagrams. It should be understood that numerous specific details, relationships, and methods are set forth to provide a full understanding of the present disclosure. One skilled in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION

Figure 1:
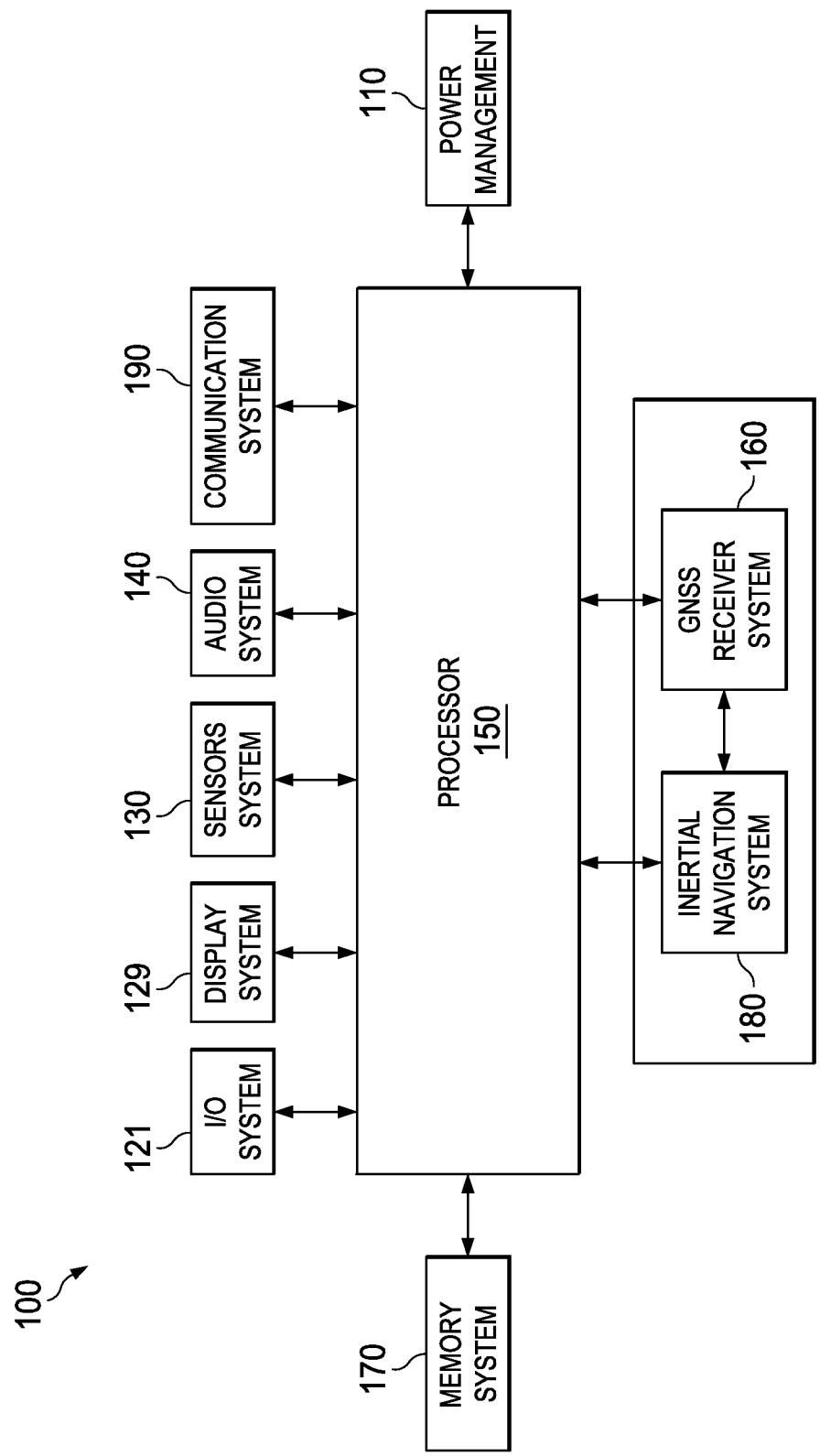
FIG. 1 is an example device in which various aspects of the present disclosure are seen.

FIG. 1 is an example device in which various aspects of the present disclosure are seen. As shown, the device 100, in one embodiment, comprises a power management unit 110, an input/output (I/O) system 121, a display system 129, a sensor system 130, an audio system 140, a processor 150, a GNSS receiver system 160, a memory system 170, an inertial navigation system 180, and a communication system 190. Each element is described in further detail below.

The power management unit 110 powers the device 100 for a desired operation. The power management unit 110 supplies power to the device from one or more batteries mounted on a vehicle or moving object. In one alternative embodiment, if device 100 is a mobile device mounted on a vehicle, then the power may be supplied from the mobile device battery. In some embodiments, the power management unit 110 further comprises circuitry, integrated circuits and other functional modules to manage and distribute power to various components 110 through 190 according to the power requirements of the respective components.

The I/O system 121 enables an exchange of information, data or commands to and from the device 100 with external systems or a user. The I/O system 121 comprises, but is not limited to, a keyboard/pad, touch screen, USB ports, wireless ports, smart card interface, mouse and/or other control devices. Each component in the I/O system 121 is configured to operate as prescribed by one or more standards.

The display system 129 is configured to provide a visual output to the user of the device 100. The display system 129 comprises display devices such as, but not limited to, a display screen capable of displaying pictures, video and 3D pictures, 3D video, one or more LED status indicators, projectors, night vision lights, together with their associated drivers and ancillary components. The display system 129 receives information or data in a predetermined format and displays the data on one or more display devices in accordance with the predetermined format.

The sensor system 130 is configured to determine the status and conditions around the device 100. The sensor system 130 comprises multiple sensors deployed throughout the device 100 to determine the condition around the device 100 by working in conjunction with one another or independently of one another. In one embodiment, the sensor system 130 is configured to determine the context under which the device 100 is being used. The sensor system 130 includes sensors such as, but not limited to, sensors for measuring temperature, humidity, motion, torque, magnetic orientation and/or other parameters.

The audio system 140 manages the audio interface to device 100. The audio system 140 is configured to receive an audio signal from the user or from other device(s) through one or more microphones (not shown). The audio signals generated within the device 100 such as sound alerts, etc., are provided by one or more speakers. In one embodiment, the audio system 140 includes other ancillary functionality and components (such as speech recognition) to enable the device 100 to recognize spoken user commands through a suitable audio interface.

The communication system 190 is configured to establish communication between the user device 100 and external system(s)/device(s) through one or more wireless communication channels. In one embodiment, the communication system 190 comprises functionality and components that enable the device 100 to transmit and receive data according to one or more of communication standards such as, but not limited to, GSM, CDMA, GPRS, Wi-Fi, LAN, and Bluetooth. Thus, the data from other components 110 through 180 is exchanged over one or more wireless channels through the communication system 190.

The memory system 170 is configured to store data and instructions (e.g., one or more programs) for execution by the processor 150. The memory system 170 provides a direct interface with other system in the device 100 or through the processor 150. The memory system 170 includes, but is not limited to, different types of Read Only Memory (ROM), Random Access Memory (RAM), external memory disks, removable disks, and flash, caches and data cards.

The processor 150 is configured to execute instructions to perform various mathematical and control operations. The processor 150 comprises one or more processors or processor cores operating in conjunction to execute multiple instructions sequentially or simultaneously. The processor 150 comprises processors or cores customized to efficiently perform specific tasks, such as one or more Digital Signal Processing (DSP) cores, Math co-processors etc. In one embodiment, the processor 150 is configured to perform operations related to systems 110 through 140 and 160 through 190 by executing a respective set of instructions (programs) stored in, for example, the memory system 170. Thus, the processor 150 lends processing power to systems 110 through 140 and 160 through 190 and operates as part of the overall system.

The GNSS receiver system 160 is configured to receive signals from multiple GNSS satellites and to perform signal processing, data processing and computations to generate an output comprising a position and velocity solution. In one embodiment, GNSS receiver system 160 employs processor 150 for processing the data. The GNSS system 160 and INS system 170 exchange data and provide a unified velocity and position information for the navigation of the device 100.

The inertial navigation system 180 is configured to determine the position and velocity of the device 100 from known (previous) position and velocity by using the accelerometer and gyroscope measurements. In one embodiment, the inertial navigation system 180 employs Micro-Electro-Mechanical System sensors (MEMS sensors) based three-dimensional accelerometer and three-dimensional gyroscopes (together referred to as inertial measurement unit).

Figure 2A:
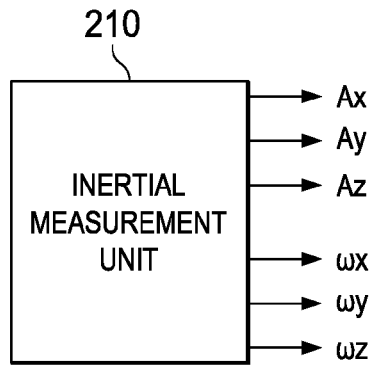
FIG. 2A is a block diagram illustrating the measurement from an example inertial measurement unit (IMU).

FIG. 2A is a block diagram illustrating the measurement from, an example IMU. As shown there, the IMU 210 provides three-dimensional accelerations (Ax, Ay, Az) and three-dimensional angular velocities ($\omega x$, $\omega y$, $\omega z$) as output. The three accelerations (Ax, Ay, Az) and three dimensional angular velocities ($\omega x$, $\omega y$, $\omega z$) are measured in the three reference axes (x, y, z) of the IMU. The sensors (accelerometer and gyroscopes) may be mounted on an object such that the reference axis (x, y, z) of the IMU coincides with the reference axis of the object. In scenarios in which the IMU is mounted on the object in an arbitrary unknown orientation, the measurements from the IMU are appropriately translated from IMU frame of reference to the object reference frame.

Figure 2B:
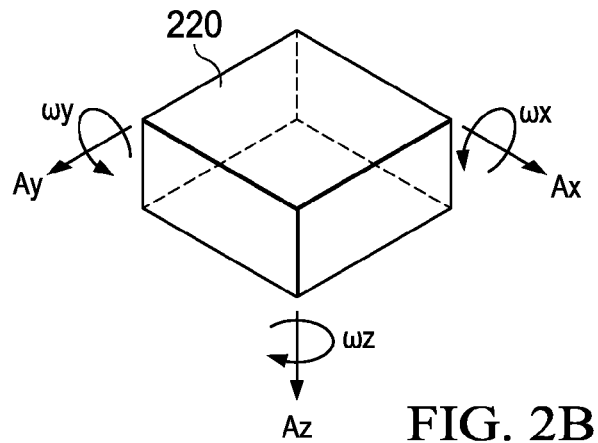
FIG. 2B illustrates an example object 220 on which MEMS sensors are mounted such that the reference axes (x, y, z) coincide with the geometry of the object.

FIG. 2B illustrates an example object 220 on which MEMS sensors are mounted such that the reference axes (x, y, z) coincide with the geometry of the object 220. Thus, the acceleration/orientation of the object 220 may be determined with reference to its geometry (like face, edge, and corners). The three-dimensional velocity, position and orientation of the object 220 are computed using the acceleration (Ax, Ay, Az) and angular velocity ($\omega x$, $\omega y$, $\omega z$).

Conventionally, a new position of the object after the time T with respect to a prior position is obtained by repeated (double) integration of acceleration (Ax, Ay, Az). Similarly, the orientation of the object after a time T with respect to a prior orientation is obtained by repeated integration of the angular velocity, as well known in the art.

However, non-idealities (or inherent errors) in the sensor measurements such as but not limited to bias offset, bias drifts and noise cause errors in the acceleration and angular velocity output of the IMU. Apart from the non-idealities, gravity leakage (as is well known in the relevant art) causes further error in the acceleration measurements. In particular, such error in the acceleration lead to the error in the velocity and position computed from the acceleration. An example error in the velocity and position due to gravity leakage is described in further detail below for illustration. However, other factors such as offset, noise may also contribute to the error and are not described here merely for the brevity.

Figure 3A:
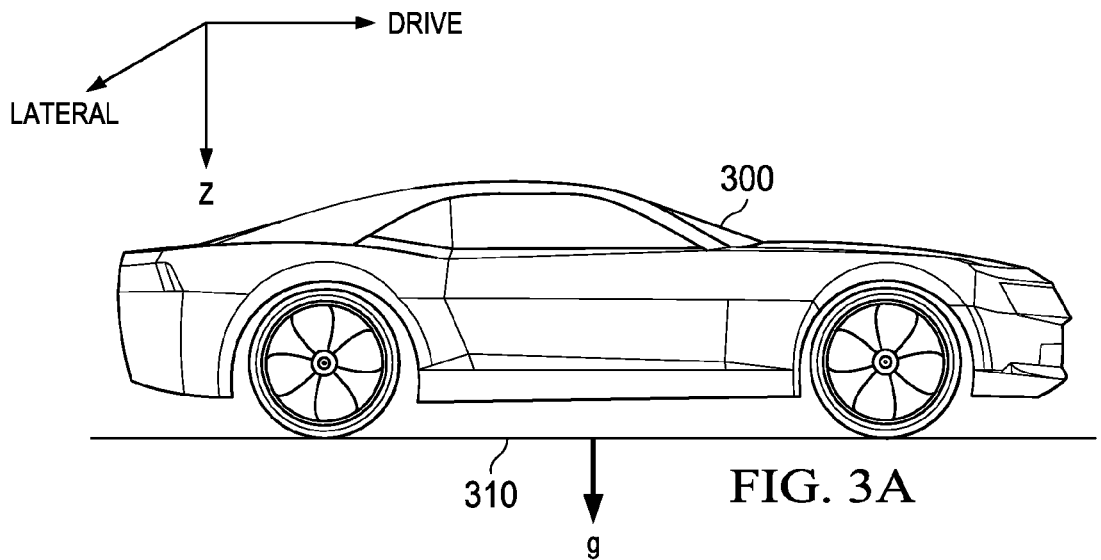
FIG. 3A is an example vehicle to which an IMU has been mounted.

FIG. 3A is an example vehicle mounted with the IMU 220. As shown there, the IMU is mounted such that the x-axis is aligned along the drive direction of the vehicle 300, the y-axis is aligned lateral to the drive direction and the z-axis is aligned in the direction of acceleration due to gravity g (gravity vector). The horizontal plane 310 on which the vehicle is resting/moving is normal to the gravity vector. Accordingly, the acceleration due to gravity (g) influences the measurement of acceleration only in the z-axis, as the drive axis and lateral axis are normal (at 90 degrees) to the gravity vector.

In some scenarios, however, the acceleration due to gravity may affect the acceleration measurement in the other axes as well. An example scenario in which the acceleration due to gravity may affect the computation of the velocity and position of the vehicle is described with reference to FIG. 3B.

Figure 3B:
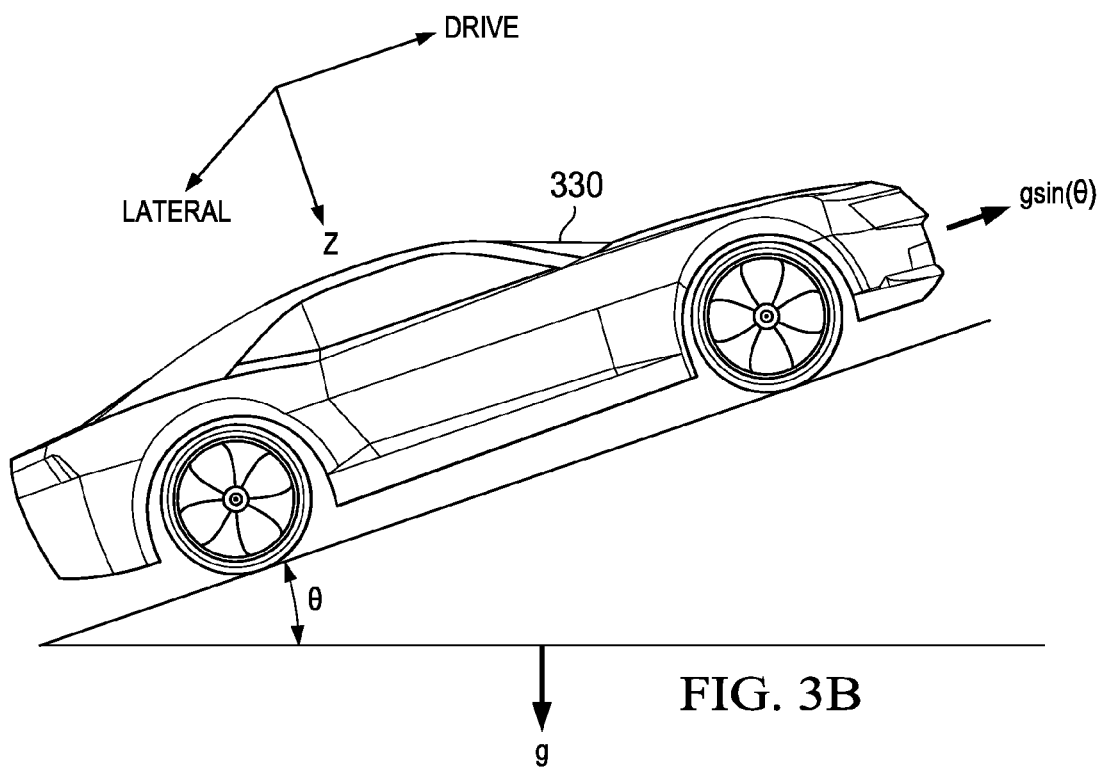
FIG. 3B illustrates an example scenario in which the acceleration due to gravity may affect the computation of the velocity and position of a vehicle.

FIG. 3B illustrates an example scenario in which the acceleration due to gravity may affect the computation of the velocity and position of a vehicle (during dead reckoning such as inside a parking lot, for example). The vehicle in FIG. 3B is shown on an inclined plane 330 making an angle θ with respect to the horizontal plane that is normal to the gravity vector. Due to the relative angle θ, a fraction, (for example: g*sin(θ)) of acceleration due to gravity (g) leaks on to the drive axis, as is apparent. Thus, the leakage of gravity affects acceleration measurement in the drive direction thereby causing error in the determination of velocity and position in the drive axis. For example, if the vehicle travels for 40 seconds on the inclined plane 330 making an angle of 6 degrees with the horizontal plane 310, the distance travelled will have an error of 800 meters (given by: $0.5 \times g \sin(\theta) \times (40)^2$). Apart from the gravity leakage, the error in the acceleration may also be caused due to other factors such as bias offset and noise. The manner in which the velocity and position error may be reduced in one embodiment is described in further detail below.

Figure 4:
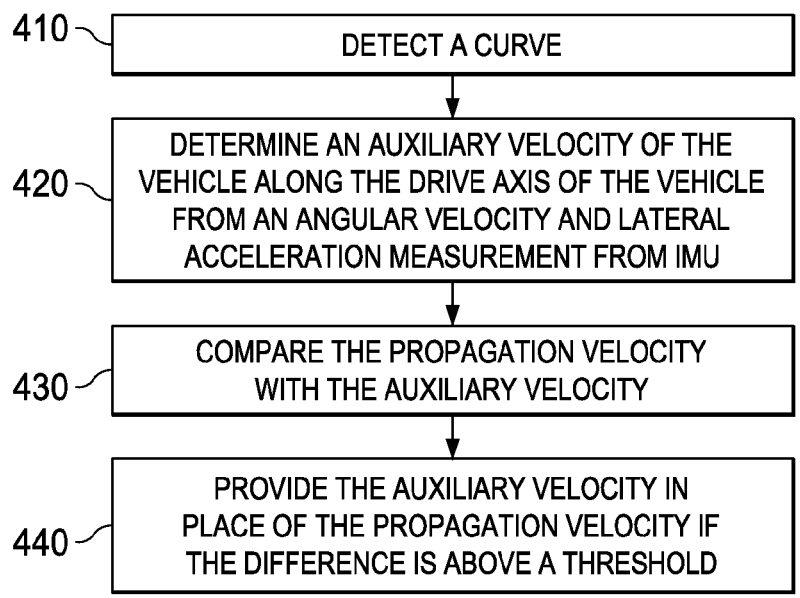
FIG. 4 is a block diagram illustrating the determination of velocity from IMU measurements in one embodiment.

FIG. 4 is a block diagram illustrating the determination of velocity from IMU measurements in one embodiment. Each block is described in further detail below.

In block 410, the device 100 detects a curve. The device may detect movement of the vehicle on a curved path from the angular velocity measurements received from IMU 210. In one embodiment, the relevant angular velocity may be used to detect the movement of the vehicle on a curve. For example, angular velocity coz may be used when vehicle is moving over horizontal plane 310 or inclined plane 330. Alternatively, multiple angular velocities may be used to detect a curve. The device 100 may determine the curve when the desired angular velocity is greater than a threshold value.

In block 420, the device 100 determines a velocity of the vehicle (referred to as auxiliary velocity) along the drive axis of the vehicle from an angular velocity and lateral acceleration measurement from IMU. The device may use the relationship below to compute the auxiliary velocity $\hat{v}$:

$$\hat{v} = \frac{a_{lat}}{\omega_z}, \quad (1)$$

wherein $a_{lat}$ is the acceleration in the direction lateral to the drive direction and $\omega z$ is the angular velocity of the vehicle in the direction of rotation of the vehicle on the curve. In one embodiment, $a_{lat}$ and $\omega z$ are the measurements of the IMU during the curved motion of the vehicle.

In block 430, the device 100 compares the propagation velocity with the auxiliary velocity. In one embodiment, the device 100 determines the difference between the auxiliary velocity and the propagation velocity. The propagation velocity is determined by integrating the acceleration measurement in the drive direction (For example, Ax) received from IMU 210.

In block 440, the device 100 provides the auxiliary velocity in place of the propagation velocity if the absolute difference between the auxiliary velocity and the propagation velocity is greater than a threshold. The device 100 uses the auxiliary velocity to compute the new position information from the previous position information. As a result, the accumulation of error is controlled or limited to certain extent by using the auxiliary velocity measured at curves. Thus, the vehicle may navigate using INS system for a longer time in the absence of GNSS service or without using GNSS system. Such scenario is encountered more frequently when the vehicle navigates in a multi-level car parking lot where GNSS service is unavailable and the vehicle undergoes frequent turns, for example.

The manner in which the auxiliary velocity in the direction of the propagation may be determined in one embodiment is described below.

Figure 5:
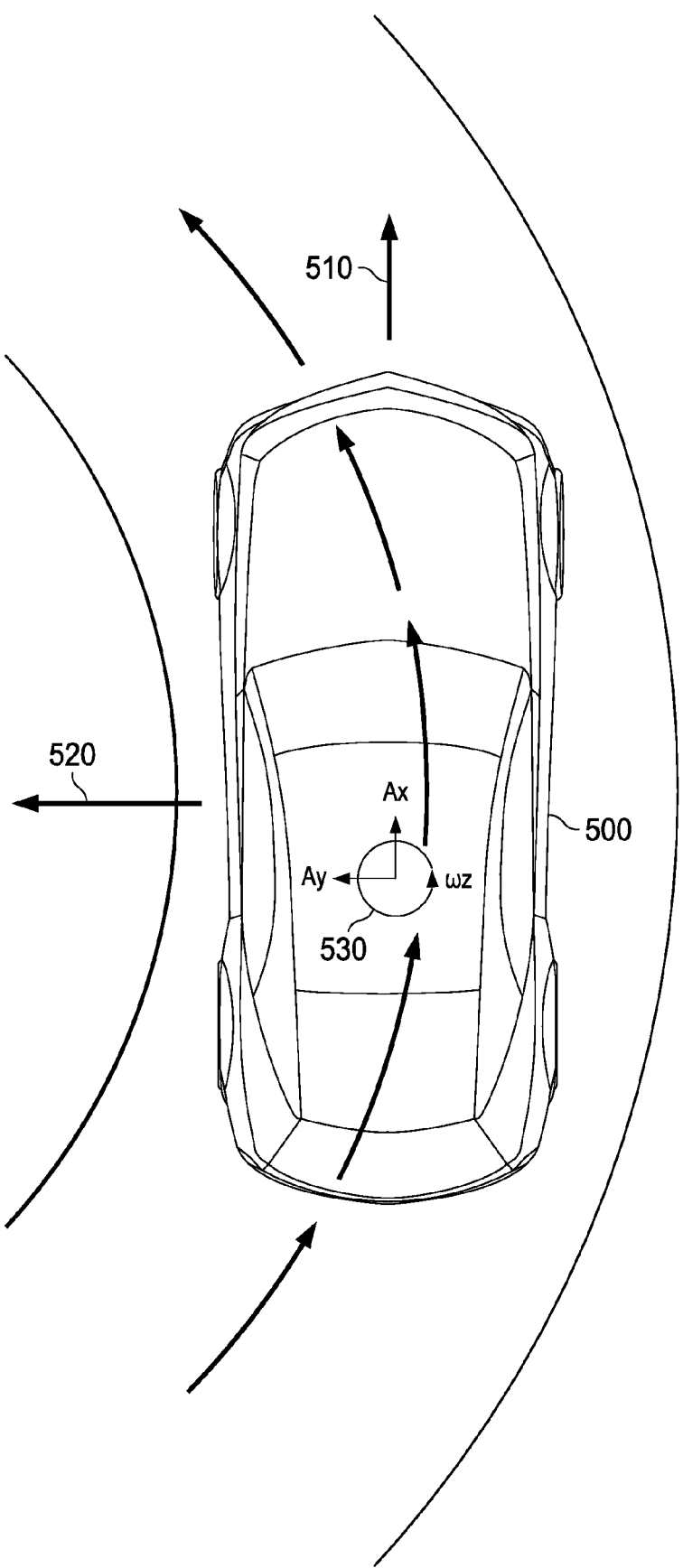
FIG. 5 depicts example directions of forces when vehicle is moving on a curved path.

FIG. 5 depicts example directions of forces when vehicle is moving on a curved path. In the figure, the direction 510 represents speed/velocity in the direction of propagation of the vehicle. The direction 530 represents the angular motion of the vehicle 500 and the direction 520 represents the direction of centripetal acceleration (force) caused due to the angular (curved) motion. In one embodiment, the IMU 210 is mounted on the vehicle 500 such that the acceleration Ax, Ay and angular velocity $\square z$ of the IMU 210 are in the direction 510, 520 and 530 respectively. Accordingly, the speed of the vehicle 500 in the x-direction may be determined using measured Ax and/or using measured Ay and angular velocity $\square z$ from IMU 210. In one embodiment, the speed of the vehicle 500 is determined using Ax of IMU 210 when vehicle is travelling in the straight line. An auxiliary speed is determined using Ay and angular velocity $\square z$ of IMU 210 when the vehicle is detected to be in motion on a curved path. The auxiliary speed is used to correct the error in the speed computed from acceleration measurement Ax. The Auxiliary speed/velocity $\hat{v}$ in x direction (drive direction) may be represented in terms of the measured IMU 210 outputs as $$\hat{v} = \frac{a_{lat}^{meas}}{\omega_z^{meas}} \quad (2)$$

wherein, the $a_{lat}^{meas}$ represents the y-axis acceleration measurement and $\omega_z^{meas}$ represents the angular velocity measurement output from the IMU 210 about z-axis.

However, the measured $a_{lat}^{meas}$ and $\omega_z^{meas}$ may not represent the true values of the acceleration ($a_{lat}^{meas}$) and angular velocity ($\omega_z^{meas}$) due to bias and other errors. Hence the accuracy of the auxiliary velocity $\hat{v}$ may be limited by the extent of the bias errors. The measured $a_{lat}^{meas}$ and $\omega_z^{meas}$ may be represent in terms of true value and bias errors as;

$$\frac{a_{lat}^{meas}}{\omega_z^{meas}} = \frac{a_{lat}^{true} + b_a}{\omega_z^{true} + b_\omega}, \quad (3)$$

wherein $b_a$ and $b_\omega$, represents the bias error in acceleration and angular velocity respectively. From the relationship in equation 3, the accuracy of the auxiliary velocity may be refined (accuracy may be enhanced) and represented as:

$$\hat{v} \approx \frac{a_{lat}^{true}}{\omega_z^{true}}\left(1 - \frac{b_\omega}{\omega_z^{true}}\right) + \frac{b_a}{\omega_z^{true}}\left(1 - \frac{b_\omega}{\omega_z^{true}}\right). \quad (4)$$

The bias terms $b_a$ and $b_\omega$, may be estimated when the vehicle is travelling in a straight line or at rest and may be compensated to improve the accuracy of the auxiliary velocity. Further, from relation 4, the error in the auxiliary velocity may be reduced for larger values of the true angular velocity or $\omega_z^{true}$.

The auxiliary velocity may be represented in terms of the measured $a_{lat}^{meas}$ and $\omega_z^{meas}$ as $$\hat{v} \approx \frac{a_{lat}^{meas}}{\omega_z^{meas}}\left(1 + \frac{b_\omega}{\omega_z^{meas}}\right) - \frac{b_a}{\omega_z^{meas}}\left(1 + \frac{b_\omega}{\omega_z^{meas}}\right) \quad (5)$$

Accordingly, in one embodiment, the device 100 is configured to compute the auxiliary velocity using relation (5) when the true $\omega_z^{true}$ is greater than a predetermined threshold value (during large turns). For example the device 100 is configured to compute the auxiliary velocity (detection of curve is positive) when:

$$|\omega_z^{true}| = |\omega_z^{meas} - \hat{b}_\omega| > \text{Threshold1}, \quad (6)$$

wherein $\hat{b}_\omega$ is the bias estimate of angular velocity.

The manner in which the auxiliary velocity/speed may be computed with reduced error, in an embodiment, is described below.

Figure 6:
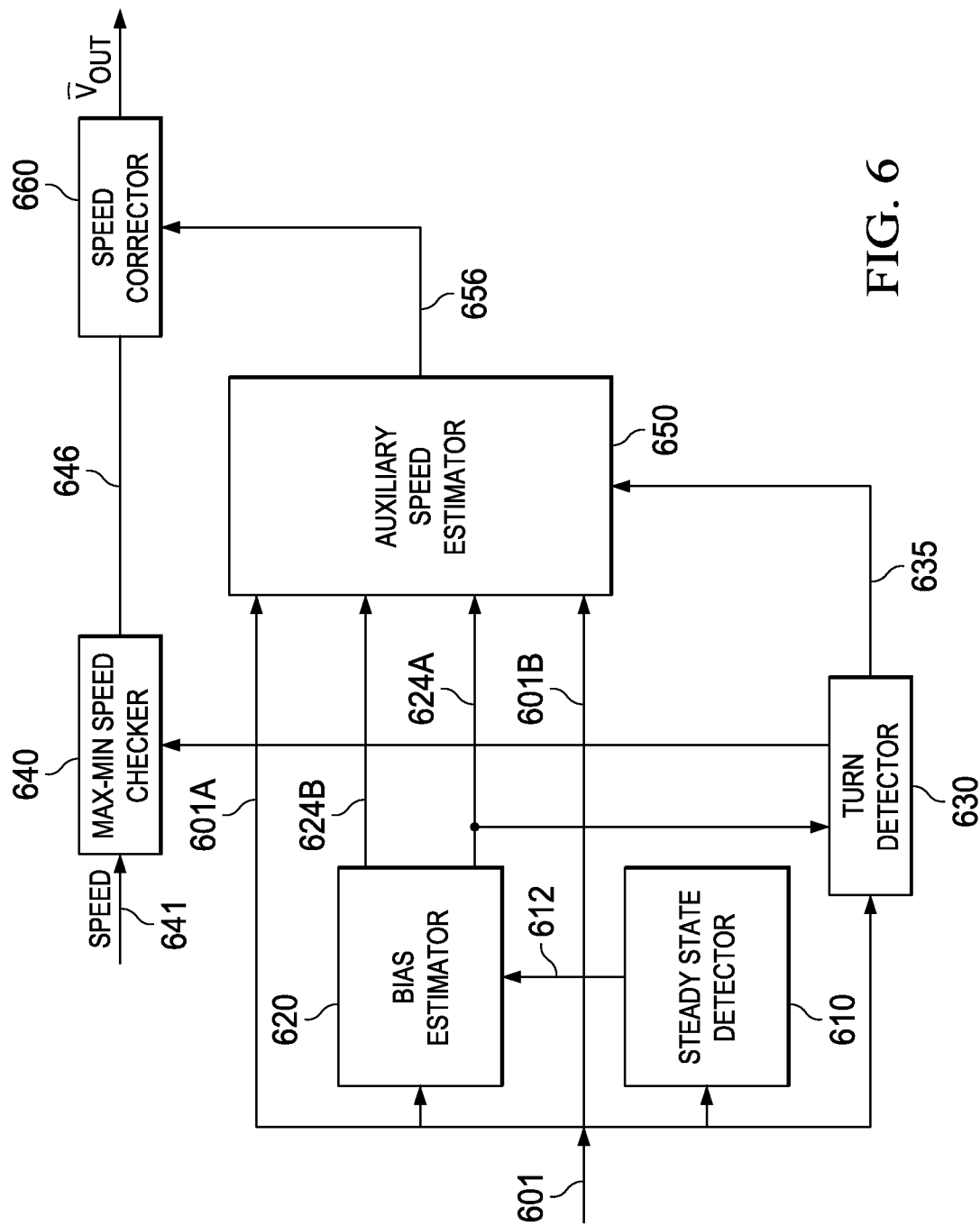
FIG. 6 is a block diagram of an example speed correcting unit.

FIG. 6 is a block diagram of an example speed correcting unit. The block diagram is shown comprising steady state detector 610, bias estimator 620, curve/turn detector 630, max-min speed checker 640, auxiliary speed estimator 650 and speed corrector 660. Each block is described in further detail below.

The steady state detector 610 is configured to detect the steady state conditions of the vehicle such as when the vehicle is at rest, or travelling in a straight line. The detected conditions are provided to the bias estimator 620. The steady state detector 610 may use one or more IMU measurements and/or information coming from GNSS such as three-dimensional position and velocity (received on path 601) to determine the steady state condition of the vehicle. For example, the vehicle may be determined to be at rest when the acceleration measurement (received from IMU 210) in the drive direction is less than a threshold value. Similarly, vehicle may be determined to be travelling in a straight line when the angular velocity (for example, $\omega_z^{meas}$) less than a threshold value.

In one embodiment, the steady state detector 610 employs the acceleration (Ax, Ay, Az) measurements received from IMU 210 and determine that the vehicle is in a rest state (one of the steady states) when one or more conditions below are satisfied:

$$\frac{1}{N}\sum_{i=1}^{N} a_{xi}^2 - \left(\frac{1}{N}\sum_{i=1}^{N} a_{xi}\right)^2 \leq Threshold \quad (7)$$

$$\frac{1}{N}\sum_{i=1}^{N} a_{yi}^2 - \left(\frac{1}{N}\sum_{i=1}^{N} a_{yi}\right)^2 \leq Threshold \quad (8)$$

$$\frac{1}{N}\sum_{i=1}^{N} a_{zi}^2 - \left(\frac{1}{N}\sum_{i=1}^{N} a_{zi}\right)^2 \leq Threshold \quad (9)$$

wherein, $a_{xi}$, $a_{yi}$, and $a_{zi}$ are the $i^{th}$ acceleration measurements in x, y and z direction respectively, i is an integer ranging from 1 to N, and N represents the total number of measurement in an observation time window.

In another embodiment, the steady state detector 610 employs the angular velocity-($\omega x$, $\omega y$, $\omega z$) measurements received from IMU 210 and determine that the vehicle is moving in a straight line (one of the steady state) when the condition below is satisfied:

$$\frac{1}{N}\sum_{i=1}^{N} \omega_{zi}^2 - \left(\frac{1}{N}\sum_{i=1}^{N} \omega_{zi}\right)^2 \leq Threshold2 \quad (10)$$

wherein $\omega_{zi}$ is $i^{th}$ angular velocity measurement in z direction, i is an integer ranging from 1 to N, and N represents the total number of measurement in an observation time window.

In an alternative embodiment, the steady state detector 610 uses the position and velocity estimates ($v_x$, $v_y$, $v_z$) from the GNSS system 160. The steady state detector 610 computes accelerations ($a_x^{GNSS}$ $a_y^{GNSS}$ $a_z^{GNSS}$) by differentiating velocity estimates as below (with $$\frac{\partial}{\partial t}$$

representing the partial deferential:

$$\begin{cases} a_x^{GNSS} = \frac{\partial}{\partial t} v_x, \\ a_y^{GNSS} = \frac{\partial}{\partial t} v_y, \\ a_z^{GNSS} = \frac{\partial}{\partial t} v_z \end{cases} \quad (11)$$

Similarly, the heading of the vehicle $\Psi^{GNSS}$ may be computed from the received GNSS velocity as:

$$\psi^{GNSS} = \tan^{-1}\left(\frac{v_y}{v_x}\right) \quad (12)$$

The computed accelerations ($a_x^{GNSS}$ $a_y^{GNSS}$ $a_z^{GNSS}$) are then used to determine the steady state condition. For example the computed accelerations ($a_x^{GNSS}$ $a_y^{GNSS}$ $a_z^{GNSS}$) may be used (in place of ($a_{xi}$, $a_{yi}$, and $a_{zi}$) in the equations 7, 8, and 9 to determine the rest state. The other exemplary steady state; namely a straight line motion may be determined using the following relation:

$$\frac{1}{N}\sum_{i=1}^{N} \psi_i^{GNSS^2} - \left(\frac{1}{N}\sum_{i=1}^{N} \psi_i^{GNSS}\right)^2 \leq Threshold\_2 \quad (13)$$

wherein the $\Psi_i^{GNSS}$ represents the heading of the vehicle at time i computed from the GNSS velocity.

The bias estimator 620 is configured to estimate the bias error in the acceleration and the gyro measurements. The bias estimator receives the steady state conditions of the vehicle from the steady state detector 610 (on path 612) and estimates the bias error from the acceleration and angular velocity measurements received from IMU 210 on path 601. The estimated bias for the angular velocity and acceleration is provided to auxiliary velocity measurement unit 650. In one embodiment, the bias estimator 620 estimates $b_\omega$ and $b_a$ and provides the estimated values $\hat{b}_\omega$ and $\hat{b}_a$ to the auxiliary speed estimator 650 on path 624A and 624B respectively.

In one embodiment, when the rest state is detected, the bias estimator 620 estimates the biases using the relation:

$$\hat{b}_y^a = \frac{1}{N}\sum_{i=1}^{N} a_{yi} \quad (14)$$

and $$\hat{b}_z^\omega = \frac{1}{N}\sum_{i=1}^{N} \omega_{zi}$$

wherein $\hat{b}_y^a$ represents the bias in the acceleration measurement in y direction (the lateral acceleration measurement) and $\hat{b}_z^\omega$ represents the bias in the angular velocity measurement about the z axis.

Alternatively, the bias estimator may compute biases $\hat{b}_y^a$ and $\hat{b}_z^\omega$ as:

$$b_y^a = a_y^{GNSS} - a_y \quad (15)$$

and $$b_z^\omega = \frac{\partial}{\partial t}\psi^{GNSS} - \omega_z$$

The curve/turn detector 630 is configured to detect the turn or curved motion of the vehicle. The curve detector 630 monitors the angular velocity (for example, $\omega_z^{meas}$) to determine the curved motion of the vehicle. In one embodiment, the turn detector 630 receives the bias estimate $b_\omega^z$ of the angular velocity $\omega_z^{meas}$ (on path 624A) and determines the curved motion of the vehicle when relation (6) is true.

The max-min speed checker 640 checks the velocity/speed obtained from the acceleration in the drive direction against preset probable maximum and minimum values. The checked speed is provided on path 646. For example, when the acceleration measurement is continuously integrated over a long time period, the speed thus computed may reach a very high value or zero depending on the slope of the terrain on which vehicle is navigating. The max-min speed checker 640 restricts the speed to a preset maximum value. Similarly, the max-min speed checker 640 does not allow the speed to go below a preset minimum value when the steady state detector 610 does not indicate that the vehicle is at rest. In another embodiment, the max-min speed checker 640 may use different maximum limit during the turns. Accordingly, the max-min speed checker 640 receives the turn detection signal from the turn detector and compares the speed with the maximum speed set for the turns. In one embodiment, the speed received on path 641 is the speed computed by the GNSS receiver system before the dead reckoning. In another embodiment, the speed on path 641 is obtained by integration of acceleration measurement in the drive direction.

The auxiliary speed estimator 650 determines the auxiliary velocity from the lateral acceleration, angular velocity and bias estimates. In one embodiment, the auxiliary speed estimator 650 uses the estimates of the bias $\hat{b}_\omega$ and $\hat{b}_a$ (received on path 624a and 624b), lateral acceleration measurement $a_{lat}^{meas}$ on path 601A and angular velocity measurement $\omega_z^{meas}$ on path 601B. The auxiliary velocity is computed in accordance with the relation (5). The turn detector output on path 635 activates the auxiliary speed estimator 650 when the determination is positive/true.

The speed corrector 660 is configured to compare speed on path 656 and 646 and to provide the corrected velocity output. The speed corrector 660 receives the auxiliary velocity $\hat{z}$ on path 656 and the checked speed on path 646. In one embodiment speed corrector provides the corrected output using the relation;

(16) If $|\hat{v}_{aux} - \hat{v}_{current}^{acc}| > \text{Threshold2}$, $\hat{v}_{out} = \hat{v}_{aux}$ Else, $\hat{v}_{out} = \hat{v}_{current}^{acc}$, wherein $\hat{v}_{current}^{acc}$ is the speed computed by integrating the acceleration in drive direction. In another embodiment, the $\hat{v}_{current}^{acc}$ represents a current speed received from the GNSS receiver.

The manner in which the GNSS receiver 160 and INS 180 may interact to provide unified velocity and position information, in one embodiment, is described below in further detail.

Figure 7:
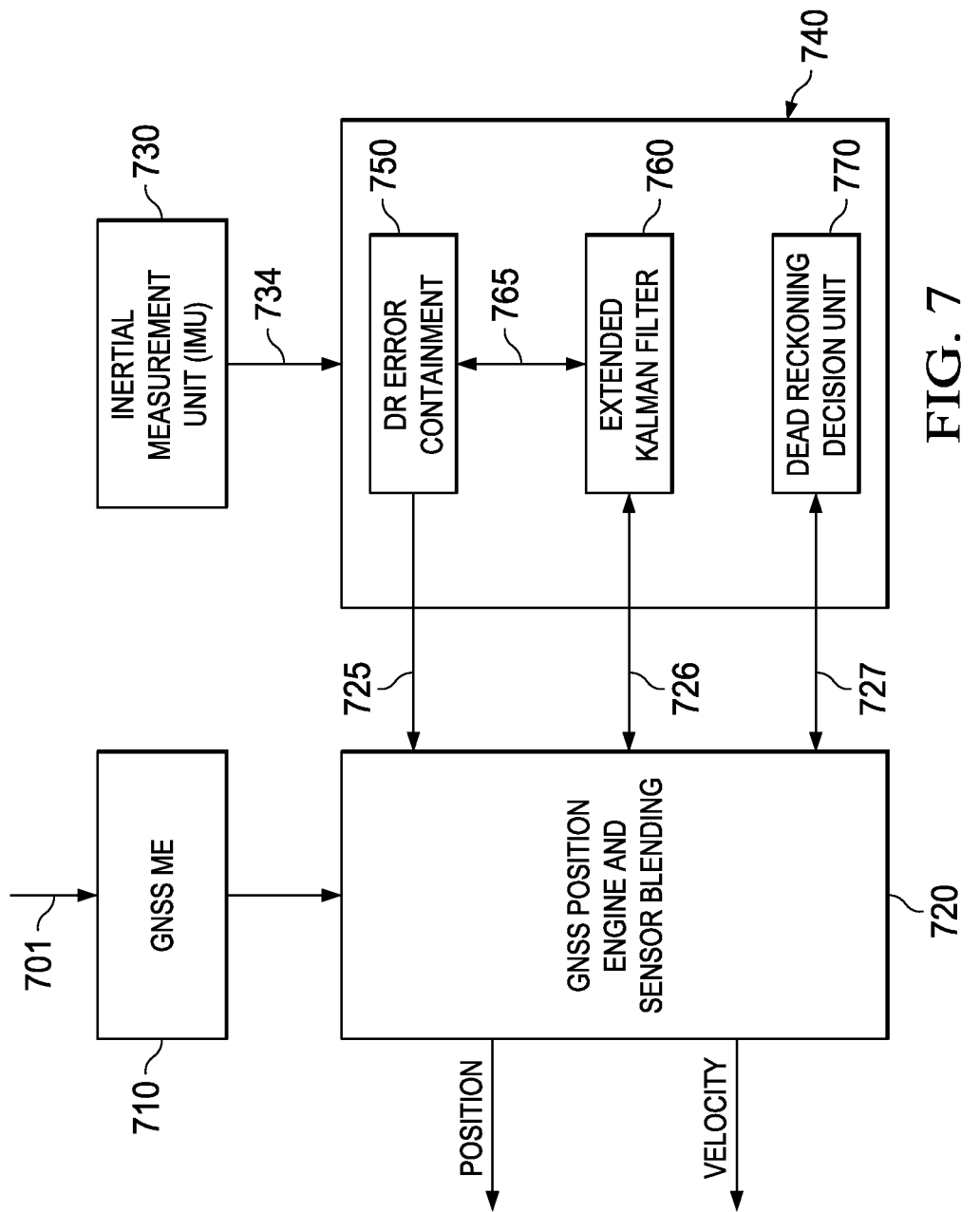
FIG. 7 is a block diagram illustrating the exchange of signals between the INS and the GNSS system in one embodiment.

FIG. 7 is a block diagram illustrating the exchange of signals between the INS and the GNSS system in one embodiment. The block diagram is shown comprising GNSS measurement engine (GNSS ME) 710, GNSS position engine & sensor blender (hereafter "blender") 720. IMU 730 and INS engine 740. The INS engine 740 is shown further comprising extended Kalman filter (EKF) 760, Dead Reckoning (DR) Decision unit 770, and Dead Reckoning (DR) error containment block 750. Each block is described below in further detail.

GNSS ME 710 receives the signal from the GNSS satellites that are visible and computes pseudo ranges and Doppler. The pseudo ranges, Doppler, and other relevant information required for determining the position and velocity is provided to the GNSS position engine and to the sensor blender 720.

The DR Decision unit 770 receives the satellite visibility information from the sensor blender 720. The DR Decision unit 770 may decide the DR condition based on the number of satellites in the visibility. For example, when the number of satellites in the visibility is less than three, the decision unit 770 may decide the condition as DR.

The extended Kalman filter (EKF) 760 receives the acceleration and gyro measurement from the IMU 730 (similar to IMU 210) and velocity and Doppler information from GNSS position engine & sensor blender 720 and computes the position and velocity. The computed velocity is provided to the DR error containment block 750 on path 765 to correct the error in the velocity as described in the above sections. EKF 760 may use the calibration assistance information, satellite visibility information provided on path 726 received from decision unit 720. The EKF 760 provides the velocity and position information to the sensor blender 720 for blending the INS position and GNSS position information.

In one embodiment DR error containment block 750 receives the velocity information from the EKF 760 and/or blender 720 and provides a corrected velocity to the blender 720. In one embodiment, the DR error containment block 750 operates to compare the received velocity with the auxiliary velocity described with reference to FIG. 6.

In one embodiment, the GNSS position engine and the sensor blender 720 are configured to exchange signals with INS engine 740 and provide a unified position and velocity information. The sensor blender 720 provides the calibration assistance signals to the EKF 760. For example the blender may provide position and velocity computed from the pseudo ranges and Dopplers for adjusting the initial position and velocity value by the EKF 760. Further the sensor blender 720 receives the corrected velocity from DR error containment block 750 and provides the corrected velocity and a position during the dead reckoning. Accordingly, the unified position and velocity is less affected by the errors in the INS and GNSS systems.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. A process comprising:
   determining a propagation speed from a first acceleration measurement in a first drive direction of a vehicle;
   determining an auxiliary speed in a second drive direction of the vehicle from an angular velocity measurement and a lateral acceleration measurement;
   comparing the auxiliary speed and a propagation speed;

providing the auxiliary speed as the speed of the vehicle when a difference between the auxiliary speed and the propagation speed is above a first threshold; and obtaining the angular velocity measurement, the lateral acceleration measurement, and the first acceleration measurement from an inertial measurement unit mounted on the vehicle.

2. The process of claim 1, including determining the auxiliary speed when the angular velocity measurement is greater than a second threshold.

3. The process of claim 2, in which the auxiliary speed is determined when $|\omega_z^{meas} - b_\omega|$ is greater than the second threshold, in which $\omega_z^{meas}$ represents the angular velocity measurement, and $b_\omega$ represents a bias error in the angular velocity measurement.

4. The process of claim 3, including determining a lateral acceleration measurement bias error $\hat{b}_a$ and an angular velocity measurement bias error $\hat{b}_\omega$ when the vehicle is in steady state, the steady state including the vehicle being one of at rest and moving in straight line.

5. The process of claim 4, in which the auxiliary speed is determined using a relation:

$$\hat{v} \approx \frac{a_{lat}^{meas}}{\omega_z^{meas}}\left(1 + \frac{\hat{b}_\omega}{\omega_z^{meas}}\right) - \frac{\hat{b}_a}{\omega_z^{meas}}\left(1 + \frac{\hat{b}_\omega}{\omega_z^{meas}}\right)$$

in which $\hat{v}$ represents the auxiliary speed, $\hat{b}_a$ represents the estimated bias error in the lateral acceleration, $a_{lat}^{meas}$ represents the lateral acceleration measurement, and $\hat{b}_\omega$ represents the estimated bias error in angular velocity measurement.

6. The process of claim 5, including determining the steady state as the at rest state when at least one of the following conditions are met:

$$\frac{1}{N}\sum_{i=1}^{N} a_{xi}^2 - \left(\frac{1}{N}\sum_{i=1}^{N} a_{xi}\right)^2 \leq Threshold$$

$$\frac{1}{N}\sum_{i=1}^{N} a_{yi}^2 - \left(\frac{1}{N}\sum_{i=1}^{N} a_{yi}\right)^2 \leq Threshold$$

$$\frac{1}{N}\sum_{i=1}^{N} a_{zi}^2 - \left(\frac{1}{N}\sum_{i=1}^{N} a_{zi}\right)^2 \leq Threshold$$

in which, $a_{xi}$, $a_{yi}$, and $a_{zi}$ are the $i^{th}$ acceleration measurements in x, y and z direction respectively, i is an integer taking value from 1 to N, and N represents the total number of measurements in a unit time window.

7. The process of claim 6, including determining the steady state as the straight line motion when the following relation evaluates to true:

$$\frac{1}{N}\sum_{i=1}^{N} \omega_{zi}^2 - \left(\frac{1}{N}\sum_{i=1}^{N} \omega_{zi}\right)^2 \leq Threshold2$$

in which $\omega_{zi}$ is $i^{th}$ angular velocity measurement in z direction, i is an integer ranging from 1 to N, and N represents the total number of measurements in an observation time window.

8. The process of claim 6, in which the $\hat{b}_a$ is computed as an average of N lateral acceleration measurements and $\hat{b}_\omega$ is computed as an average of N angular velocity measurements.

9. The process of claim 6, in which $a_{xi}$, $a_{yi}$, and $a_{zi}$ are obtained by differentiating the velocity in x, y and z directions obtained from a GLASS system mounted on the vehicle.

10. The process of claim 7, in which $\omega_{zi}$ is obtained by differentiating a heading obtained from a GNSS system mounted on the vehicle.

11. A device comprising:

an inertial measurement unit mounted on a vehicle providing an angular velocity measurements, lateral acceleration measurements, and first acceleration measurements of the vehicle;

a propagation speed estimator coupled to the inertial measurement unit and determining a propagation seed a first acceleration measurement in a first drive direction of the vehicle;

an auxiliary speed estimator coupled to the inertial measurement unit and determining an auxiliary speed in a second drive direction of the vehicle from an angular velocity measurement and a lateral acceleration measurement; and a speed corrector coupled to the propagation speed estimator and the auxiliary speed estimator and providing an auxiliary speed for navigation when a difference between the auxiliary speed and a propagation speed is above a first threshold.

12. The device of claim 10, in which the auxiliary speed estimator determines the auxiliary speed when the angular velocity measurement is greater than a second threshold.

13. The device of claim 11, in which the auxiliary speed estimator determines the auxiliary speed when $|\omega_z^{meas} - b_\omega|$ is greater than the second threshold, in which $\omega_z^{meas}$ represents the angular velocity measurement, and $b_\omega$ represents a bias error in the angular velocity measurement.

14. The device of claim 12, including a bias estimator determining a lateral acceleration measurement bias error $\hat{b}_\omega$ and angular velocity measurement bias error $\hat{b}_\omega$ when the vehicle is in steady state, the steady state including the vehicle being one of at rest and moving in straight line.

15. The device of claim 13, in which the auxiliary speed estimator determines the auxiliary speed using a relation:

$$\hat{v} \approx \frac{a_{lat}^{meas}}{\omega_z^{meas}}\left(1 + \frac{b_\omega}{\omega_z^{meas}}\right) - \frac{b_a}{\omega_z^{meas}}\left(1 + \frac{b_\omega}{\omega_z^{meas}}\right)$$

in which $\hat{v}$ represents the auxiliary speed, $b_a$ represents the estimated bias error in the lateral acceleration, $a_{lat}^{meas}$ represents the lateral acceleration measurement, and $b_\omega$ represents the estimated bias error in angular velocity measurement.

16. The device of claim 14, including a steady state detector determining the at rest state when at least one of the following conditions are met:

$$\frac{1}{N}\sum_{i=1}^{N} a_{xi}^2 - \left(\frac{1}{N}\sum_{i=1}^{N} a_{xi}\right)^2 \leq Threshold$$

$$\frac{1}{N}\sum_{i=1}^{N} a_{yi}^2 - \left(\frac{1}{N}\sum_{i=1}^{N} a_{yi}\right)^2 \leq Threshold$$

$$\frac{1}{N}\sum_{i=1}^{N} a_{zi}^2 - \left(\frac{1}{N}\sum_{i=1}^{N} a_{zi}\right)^2 \leq Threshold$$

in which, $a_{xi}$, $a_{yi}$, and $a_{zi}$ are the $i^{th}$ acceleration measurements in x, y and z direction respectively, i is an integer ranging from 1 to N, and N represents the total number of measurements in an unit time window.

17. The device of claim 15, in which the bias estimator estimates $\hat{b}_a$ as an average of N lateral acceleration measurements and $\hat{b}_\omega$ as an average of N angular velocity measurements.

18. The device of claim 16, in which $a_{xi}$, $a_{yi}$, and $a_{zi}$ are obtained by differentiating the velocity in x, y and z directions respectively received from a GNSS system mounted on the vehicle.

19. An integrated circuit comprising:
   a path for receiving angular velocity measurements, lateral acceleration measurements, and first acceleration measurements from an inertial measurement unit;
   a steady state detector coupled to the path and determining a steady state that includes one of a vehicle at rest and a straight line motion of the vehicle;
   a bias estimator coupled to the path and determining a lateral acceleration measurement bias error as an average of N lateral acceleration measurements and a angular velocity measurement bias error as an average of N angular velocity measurements;
   a turn detector coupled to the path and detecting a turn;
   a speed checker coupled to the path and the turn detector, the speed checker determining a propagation speed when the turn is detected;
   an auxiliary speed estimator coupled to the path and the bias estimator, the auxiliary speed estimator determining an auxiliary speed in a drive direction of the vehicle from an angular velocity measurement and a lateral acceleration measurement when the angular velocity measurement is greater than a first threshold; and
   a speed corrector coupled to the speed checker and the auxiliary speed estimator, the speed corrector providing an auxiliary speed for navigation when a difference between the auxiliary speed and a propagation speed is above a second threshold, in which the propagation speed is determined from a first acceleration measurement in the drive direction.

20. The integrated circuit of claim 19, in which the auxiliary speed estimator determines the auxiliary speed when $|\omega_z^{meas} - b_\omega|$ greater than the first threshold, wherein $\omega_z^{meas}$ represents the angular velocity measurement, $b_\omega$ represents a bias error in the angular velocity measurement, and the auxiliary speed is determined using a relation:

$$\hat{v} \approx \frac{a_{lat}^{meas}}{\omega_z^{meas}}\left(1 + \frac{b_\omega}{\omega_z^{meas}}\right) - \frac{b_a}{\omega_z^{meas}}\left(1 + \frac{b_\omega}{\omega_z^{meas}}\right)$$

wherein $\hat{v}$ represents the auxiliary speed, $b_a$ represents the estimated bias error in the lateral acceleration, $a_{lat}^{meas}$ represents the lateral acceleration measurement and $b_\omega$ represents the estimated bias error in angular velocity measurement, and the at rest state is determined when at least one of the following conditions are met:

$$\frac{1}{N}\sum_{i=1}^{N} a_{xi}^2 - \left(\frac{1}{N}\sum_{i=1}^{N} a_{xi}\right)^2 \leq Threshold$$

$$\frac{1}{N}\sum_{i=1}^{N} a_{yi}^2 - \left(\frac{1}{N}\sum_{i=1}^{N} a_{yi}\right)^2 \leq Threshold$$

$$\frac{1}{N}\sum_{i=1}^{N} a_{zi}^2 - \left(\frac{1}{N}\sum_{i=1}^{N} a_{zi}\right)^2 \leq Threshold$$

where, $a_{xi}$, $a_{yi}$, and $a_{zi}$ are the $i^{th}$ acceleration measurements in x, y and z direction respectively, i is an integer ranging from 1 to N, and N represents the total number of measurements in an observation time window.

* * * * *